US005105081A

United States Patent [19]

Kelley

[11] Patent Number: 5,105,081

[45] Date of Patent: Apr. 14, 1992

[54] MASS SPECTROMETRY METHOD AND APPARATUS EMPLOYING IN-TRAP ION DETECTION

[75] Inventor: Paul E. Kelley, San Jose, Calif.

[73] Assignee: Teledyne CME, Santa Clara, Calif.

[21] Appl. No.: 662,271

[22] Filed: Feb. 28, 1991

[51] Int. Cl.[5] ........................ B01D 59/44; H01J 49/00

[52] U.S. Cl. .................................... 250/282; 250/291; 250/292

[58] Field of Search ................ 250/282, 290, 291, 292

[56] References Cited

U.S. PATENT DOCUMENTS

| | | | |
|---|---|---|---|
| Re. 33,344 | 9/1990 | Stafford | 250/281 |
| 3,925,662 | 12/1975 | Dawson | 250/290 |
| 4,105,917 | 8/1978 | McIver et al. | 250/292 |
| 4,686,367 | 8/1987 | Louris et al. | 250/290 |
| 4,736,101 | 4/1988 | Syka et al. | 250/292 |
| 4,755,670 | 7/1988 | Syka et al. | 250/292 |

FOREIGN PATENT DOCUMENTS 262928 9/1987 European Pat. Off. .

OTHER PUBLICATIONS

March & Hughes, *Quadrupole Storage Mass Spectometry*, Wiley Interscience (publisher), pp. 112-114.

J. L. Wiza, "Microchannel Plate Detectors", (Galileo Electro-Optics Corporation, Sturbridge, Mass. U.S.A.), 15 pages in length.

Brochure, "Galileo Detector Assemblies", (Galileo Electro-Optics Corporation), Data Sheet No. 7, pp. 1-16, Feb., 1990 (see last page for date).

J. E. Fulford, D.-N. Hoa, R. J. Hughes, R. E. March, R. F. Bonner and G. J. Wong, "Radio-Frequency Mass Selective Excitation and Resonant Ejection of Ions in a Three-Dimensional Quadrupole Ion Trap", Jul./Aug. 1980, *J. Vac. Sci. Technol.*, 17(4), pp. 829-835.

Brochure, "Galileo Hot Microchannel Plates", (Galileo Electro-Optics Corporation), Data Sheet No. 9200, pp. 1-8, 1987 (see last page for date in lower left-hand corner).

*Primary Examiner*—Bruce C. Anderson

*Attorney, Agent, or Firm*—Limbach & Limbach

[57] ABSTRACT

A mass spectrometry method and apparatus in which trapped ions of interest are detected as they strike a detector comprising at least one of the electrodes which establish the ion trapping field. The invention eliminates the need to eject ions from the trap, and thus eliminates the need to perforate one or more of the trap electrodes. In one class of preferred embodiments, the trapping field is a three-dimensional quadrupole trapping field within a region bounded by a ring electrode and a pair of end electrodes. In one embodiment, the inventive in-trap detector is a trap electrode composed (or partially composed) of phosphorescent material which emits photons in response to incidence of ions at its inward-facing surface (the surface of the electrode which faces the trap region). In another embodiment, the in-trap ion detector is a Faraday effect detector which includes an electrically isolated conductive pin mounted with its tip flush with the inward-facing surface of one of the trap electrodes.

10 Claims, 1 Drawing Sheet

MASS SPECTROMETRY METHOD AND APPARATUS EMPLOYING IN-TRAP ION DETECTION

FIELD OF THE INVENTION

The invention relates to mass spectrometry methods and apparatus in which trapped ions of interest are detected while they remain in an ion trap. More particularly, the invention is a mass spectrometry method and apparatus in which trapped ions of interest are detected as they strike a detector comprising, or formed with, at least one of the electrodes which establish the ion trapping field.

BACKGROUND OF THE INVENTION

A variety of mass spectrometry methods have been developed. Typically in such methods, trapped ions confined within a trapping field are ejected from the field for detection by an external detector.

For example, in the conventional mass spectrometry techniques known as "MS/MS" methods, ions (known as "parent ions") having mass-to-charge ratio within a selected range are stored in an ion trap. The trapped parent ions are then allowed, or induced, to dissociate to produce ions known as "daughter ions." The daughter ions are then ejected from the trap and the ejected daughter ions are detected.

For example, U.S. Pat. No. 4,736,101, issued Apr. 5, 1988, to Syka, et al., discloses an MS/MS method in which daughter ions ejected from a quadrupole ion trap are detected by an electron multiplier detector positioned outside the trap.

In another conventional mass spectrometry technique known as a chemical ionization or "CI" method, as described for example in U.S. Pat. No. 4,686,367, issued Aug. 11, 1987, to Louris, et al., stored reagent ions are allowed to react with analyte molecules in a quadrupole ion trap. The trapping field is then scanned to eject product ions which result from the reaction, and the ejected product ions are detected outside the trap.

Techniques for detecting trapped ions within an ion trap have been suggested. For example, the article by Fulford, et al., entitled "Radio-Frequency Mass Selective Excitation and Resonant Ejection of Ions in a Three-Dimensional Quadrupole Ion Trap," J. Vac. Sci. Technol., 17(4), 1980, pp. 829-835, discloses (at page 830) a "resonant power absorption" technique for indirect, in-trap detection of resonating trapped ions. In this technique, the presence of resonating trapped ions is indirectly detected by monitoring the power absorbed from a voltage signal generator while the generator applies a swept sawtooth signal to the ring electrode of a quadrupole ion trap.

The Fulford, et al. article also discloses (at page 830) an example of another technique for indirect detection of resonating trapped ions (sometimes referred to as an "image current detection" technique). In this technique, a frequency tuned detection circuit is connected across the end electrodes of an ion trap and is balanced when no ions are present in the trap. Then, ions are introduced into the trap, an RF voltage signal is applied to the trap, and the amplitude of the RF voltage signal is slowly swept. The motion of resonating trapped ions is detected as an induced alternating potential (or current) in the frequency tuned detection circuit, each time that the frequency of the ions' secular motion matches that of the tuned circuit.

Conventional methods for indirect, in-trap detection of trapped ions are complicated and difficult to implement in a manner providing adequate sensitivity.

Conventional techniques for detecting ions after they have been ejected from an ion trap also suffer limitations and disadvantages, which result principally from the need to perforate one or more of the trap electrodes to permit the ions to escape from the trap. A perforated trap electrode will inherently block a substantial number of the ions which strike it (although a substantial number may also pass through the perforations), thus inherently limiting the effective sensitivity of an out-of-trap detector which receives the ions that pass through the perforations. Furthermore, the presence of perforations in an otherwise precisely shaped electrode of an ion trap will inherently introduce distortions in the trapping field.

SUMMARY OF THE INVENTION

The invention is a mass spectrometry method and apparatus in which trapped ions of interest are detected as they strike a detector comprising, or formed with, at least one of the electrodes which establish the ion trapping field. The invention eliminates the need to eject ions from the trap, and thus eliminates the need to perforate one or more of the trap electrodes to detect ions. In one class of preferred embodiments, the trapping field is a three-dimensional quadrupole trapping field within a region bounded by a ring electrode and a pair of end electrodes.

A number of sensitive, easily implementable preferred embodiments of the inventive in-trap detection apparatus are contemplated. In one class of preferred embodiments, the in-trap detector comprises at least a portion of an electrode employed to establish the trapping field. For example, the in-trap detector can be a trap electrode composed (or partially composed) of phosphorescent material which emits photons in response to incidence of ions at its inward-facing surface (the surface of the electrode which faces the trap region). The resultant photons can then be detected.

In another embodiment, the in-trap ion detector mounted integrally with one of the trap electrodes. For example, the in-trap detector can be a Faraday effect detector which includes an electrically isolated conductive pin mounted with its tip flush with the inward-facing surface of one of the trap electrodes.

DETAILED DESCRIPTION OF THE PREFERRED EMBODIMENTS

Figure 1:
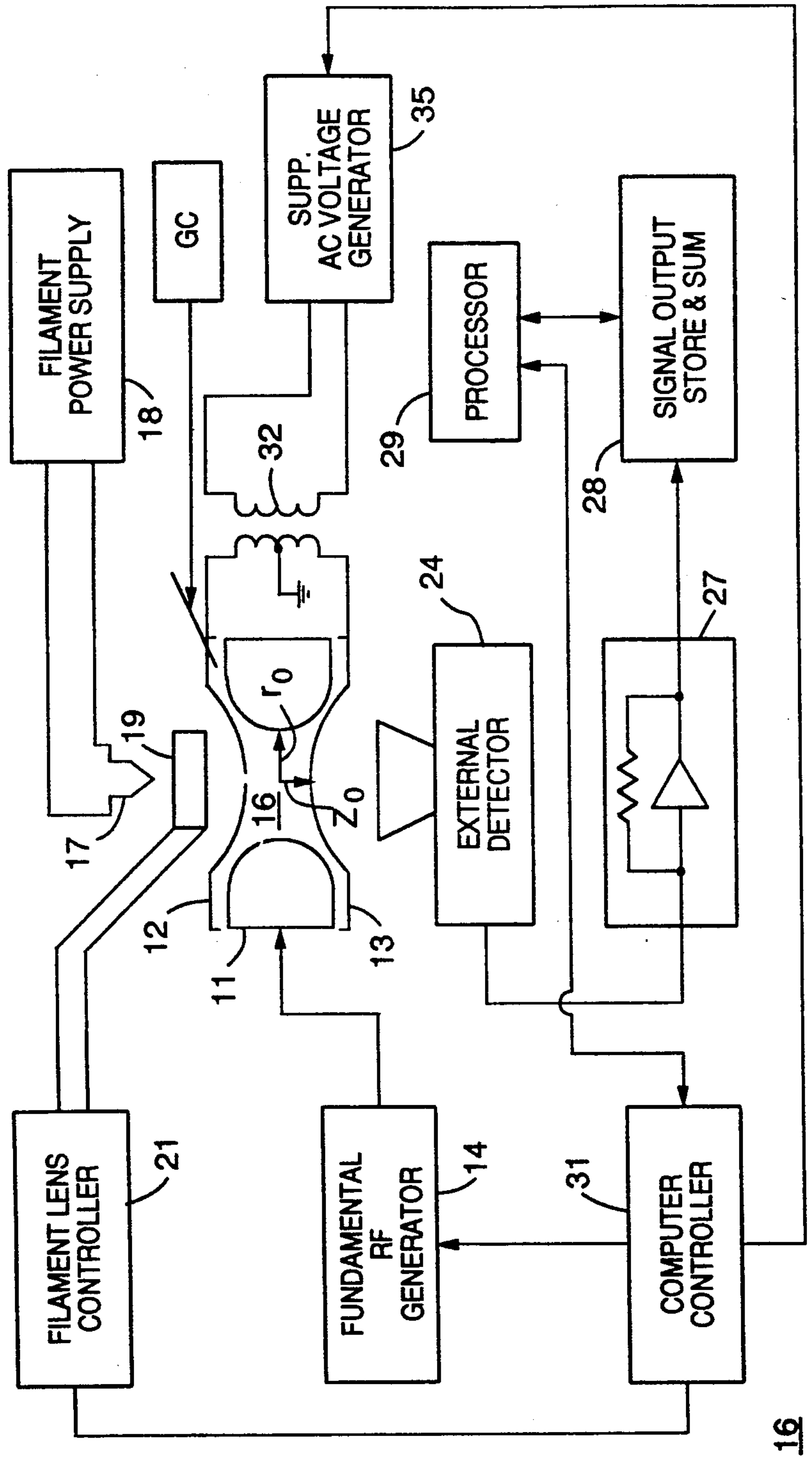
FIG. 1 is a simplified schematic diagram of an apparatus which embodies a class of preferred embodiments of the invention.

One class of preferred embodiments of the invention can be implemented in the quadrupole ion trap apparatus shown in FIG. 1. The FIG. 1 apparatus includes ring electrode 11 and end electrodes 12 and 13. A three-dimensional quadrupole trapping field is produced in region 16 enclosed by electrodes 11-13, when fundamental voltage generator 14 is switched on to apply a fundamental RF voltage (having a radio frequency component and optionally also a DC component) between electrode 11 and electrodes 12 and 13. Ion storage region 16 has dimension $z_o$ in the z-direction (the vertical direction in FIG. 1) and radius $r_o$ (in a radial direction from the z-axis through the center of ring electrode 11 to the inner surface of ring electrode 11). Electrodes 11, 12, and 13 are common mode grounded through coupling transformer 32.

Supplemental AC voltage generator 35 can be switched on to apply a desired supplemental AC voltage signal (such as the inventive filtered noise signal) across end electrodes 12 and 13 The supplemental AC voltage signal can be selected to resonate desired trapped ions at their axial resonance frequencies. Alternatively, supplemental AC voltage generator 35 (or a second AC voltage generator, not shown in FIG. 1) can be connected, between ring electrode 11 and ground, to apply a desired notch-filtered noise signal to ring electrode 11 to resonate unwanted ions (at their radial resonance frequencies) out of the trap in radial directions.

Filament 17, when powered by filament power supply 18, directs an ionizing electron beam into region 16 through an aperture in end electrode 12. The electron beam ionizes sample molecules within region 16, so that the resulting ions can be trapped within region 16 by the quadrupole trapping field. Cylindrical gate electrode and lens 19 is controlled by filament lens control circuit 21 to gate the electron beam off and on as desired.

End electrode 13 is not perforated. In one class of embodiments of the invention, all or part of end electrode 13 comprises an in-trap detector, or end electrode 13 has an in-trap detector integrally mounted in its inward-facing surface (in a manner introducing no significant perturbation in the smooth inward-facing surface, which surface faces trap region 16). For example, end electrode 13 can be composed (or partially composed) of phosphorescent material which emits photons in response to incidence of ions at its inward-facing surface (the surface of electrode 13 facing trap region 16). In this case, an external detector 24 can be employed to convert the photons output from detector electrode 13 into an electrical signal for subsequent processing. In one embodiment, a current signal output from detector 24 is supplied to electrometer 27 (which converts the current signal to a voltage signal), the output of circuit 27 is supplied to circuit 28 (which sums and stores the voltage signal asserted by circuit 27), and the output of circuit 28 is supplied to processor 29 for subsequent processing.

Figure 2:
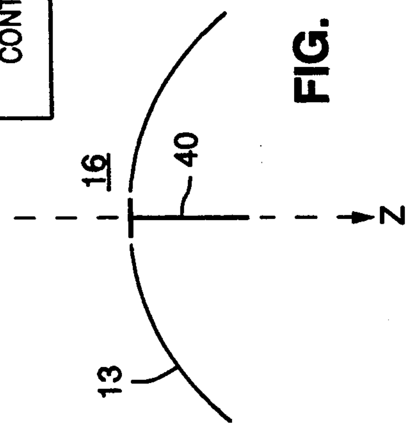
FIG. 2 is a simplified partial cross-sectional view of a first preferred embodiment of the invention.

In another class of embodiments, the in-trap ion detector mounted integrally with electrode 13 (so as to detect ions that strike end electrode 13 without introducing significant distortions in the shape of its inward-facing surface). One example of this type of in-trap ion detector is a Faraday effect detector. As indicated in FIG. 2, a preferred embodiment of such a Faraday effect detector includes an electrically isolated conductive pin 40 mounted with its tip flush with the surface of electrode 13 which faces trap region 16. Also preferably, pin 40 is positioned at a location along the z-axis of the trap (i.e., in the center of end electrode 13). Any separation between pin 40's tip and electrode 13 should be extremely small, and should be minimized in order to minimize any field perturbation introduced thereby.

In each embodiment of the invention, the in-trap detector which comprises all or part of electrode 13 (or is mounted integrally therewith) detects ions within the trap directly, as the ions strike the detector.

Throughout the remaining portion of the specification, including in the claims, the phrase "in-trap detector comprising at least part of a trap electrode" (and variations on this phrase) will be used to denote collectively all three of following cases: a detector comprising an entire trap electrode; a detector comprising a portion of a trap electrode; and a detector separate from a trap electrode, but integrally mounted with the trap electrode in a manner introducing no significant perturbation in the electrode surface which faces the trap region.

In alternative embodiments of the invention, the in-trap detector comprises at least part of electrode 11 or 12 (rather than electrode 13), or two or more of electrodes 11, 12, and 13. In each of these embodiments, any of the detector embodiments mentioned above with reference to electrode 13 can be employed to implement each in-trap detector comprising at least part of electrode 11 or 12 (or both electrode 11 and 12).

For example, the aperture in end electrode 12 can be omitted (and an alternative means is employed to introduce desired ions into trap region 16), and both end electrodes 12 and 13 can function as in-trap detectors. For another example, ring electrode 11 can have a Faraday effect detector mounted integrally with its inward-facing surface.

The output of each in-trap detector is supplied through appropriate detector electronics to processor 29.

Control circuit 31 generates control signals for controlling fundamental voltage generator 14, filament control circuit 21, and supplemental AC voltage generator 35. Circuit 31 sends control signals to circuits 14, 21, and 35 in response to commands it receives from processor 29, and sends data to processor 29 in response to requests from processor 29.

To implement the inventive method, trapped ions within region 16 are caused to strike an electrode which functions as an in-trap detector (i.e., an electrode, at least part of which comprises an in-trap detector). The ions are caused to strike the electrode, for example, by either rendering the ions unstable or by resonating the ions.

The ions can be rendered unstable or resonated by changing the field within region 16. This can be accomplished in various ways, including changing any one or combination of the A.C. voltage and D.C. voltage amplitudes and/or the frequency of the fundamental generator 14 output and the A.C. voltage amplitude and/or frequency of the supplemental generator 35 output.

Various modifications and variations of the described method and apparatus of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A mass spectrometry method, including the steps of:

(a) establishing a trapping field capable of storing ions within a trap region bounded by a set of electrodes, wherein at least one of the electrodes is a detector electrode comprising, at least in part, an in-trap ion detector;

(b) causing ions within the trap region to strike the in-trap ion detector; and (c) detecting the ions as they strike the in-trap ion detector.

2. The method of claim 1, wherein the detector electrode has an inward-facing surface which faces the trap region, and is at least partially composed of phosphorescent material which emits photons in response to incidence of ions at the inward-facing surface.

3. The method of claim 1, wherein step (a) includes the step of establishing a three-dimensional quadrupole trapping field capable of storing ions, wherein the set of electrodes includes a ring electrode, a first end electrode, and a second end electrode, and wherein the detector electrode is the first end electrode.

4. The method of claim 1, wherein the in-trap ion detector is a Faraday effect detector.

5. The method of claim 4, wherein the detector electrode has an inward-facing surface which faces the trap region, wherein the Faraday effect detector includes an electrically isolated, conductive pin having a tip, and wherein the pin is mounted with the tip flush with the inward-facing surface of the detector electrode.

6. A mass spectrometry apparatus, including:

a trapping field means for establishing a trapping field for storing ions within a trap region, wherein the trapping field means includes a set of electrodes which bound the trap region, and wherein at least one of the electrodes is a detector electrode;

an in-trap ion detector, which comprises at least a part of the detector electrode, and which includes means for detecting ions directly as the ions strike the in-trap ion detector; and means for causing ions within the trap region to strike the in-trap ion detector.

7. The apparatus of claim 6, wherein the detector electrode has an inward-facing surface which faces the trap region, and wherein the in-trap ion detector includes phosphorescent material which comprises at least part of the detector electrode, and wherein the phosphorescent material emits photons in response to incidence of ions at the inward-facing surface.

8. The apparatus of claim 6, wherein the trapping field means includes means for establishing a three-dimensional quadrupole trapping field capable of storing ions, wherein the set of electrodes includes a ring electrode, a first end electrode, and a second end electrode, and wherein the detector electrode is the first end electrode.

9. The apparatus of claim 6, wherein the in-trap ion detector is a Faraday effect detector.

10. The apparatus of claim 9, wherein the detector electrode has an inward-facing surface which faces the trap region, wherein the Faraday effect detector includes an electrically isolated, conductive pin having a tip, and wherein the pin is mounted with the tip flush with the inward-facing surface of the detector electrode.

* * * * *